United States Patent
Dropps et al.

(10) Patent No.: US 9,444,713 B1
(45) Date of Patent: Sep. 13, 2016

(54) CUT-THROUGH ROUTING FOR NETWORK DEVICES

(71) Applicant: QLOGIC, Corporation, Aliso Viejo, CA (US)

(72) Inventors: Frank R. Dropps, Maple Grove, MN (US); Craig M. Verba, Maple Grove, MN (US)

(73) Assignee: QLOGIC, Corporation, Aliso Viejo, CA (US)

(*) Notice: Subject to any disclaimer, the term of this patent is extended or adjusted under 35 U.S.C. 154(b) by 640 days.

(21) Appl. No.: 13/678,086

(22) Filed: Nov. 15, 2012

(51) Int. Cl.
| | |
|---|---|
| H04L 12/26 | (2006.01) |
| H04L 12/24 | (2006.01) |
| H04L 5/00 | (2006.01) |
| H04W 28/06 | (2009.01) |
| H04L 29/06 | (2006.01) |
| H04N 21/2381 | (2011.01) |
| H04Q 11/00 | (2006.01) |
| H04L 12/861 | (2013.01) |

(52) U.S. Cl.
CPC ......... *H04L 43/0888* (2013.01); *H04L 5/0007* (2013.01); *H04L 41/0823* (2013.01); *H04L 41/142* (2013.01); *H04L 69/08* (2013.01); *H04L 69/28* (2013.01); *H04N 21/2381* (2013.01); *H04W 28/06* (2013.01); *H04L 49/90* (2013.01); *H04Q 11/0066* (2013.01)

(58) Field of Classification Search
None
See application file for complete search history.

(56) References Cited

U.S. PATENT DOCUMENTS

| | | | |
|---|---|---|---|
| 6,526,066 B1* | 2/2003 | Weaver | 370/465 |
| 2002/0118640 A1* | 8/2002 | Oberman et al. | 370/230 |
| 2002/0118692 A1* | 8/2002 | Oberman et al. | 370/419 |
| 2003/0026205 A1* | 2/2003 | Mullendore et al. | 370/230 |
| 2003/0026206 A1* | 2/2003 | Mullendore et al. | 370/230 |
| 2003/0026267 A1* | 2/2003 | Oberman et al. | 370/397 |
| 2003/0026287 A1* | 2/2003 | Mullendore et al. | 370/442 |
| 2003/0145116 A1* | 7/2003 | Moroney | H04L 67/1097 709/249 |
| 2007/0022211 A1* | 1/2007 | Shimizu | H04L 29/12028 709/238 |
| 2008/0166046 A1* | 7/2008 | Koirala | G06T 7/0081 382/172 |
| 2010/0092174 A1* | 4/2010 | Brown | H04L 25/14 398/79 |
| 2012/0063333 A1* | 3/2012 | Gnanasekaran | H04L 47/10 370/252 |
| 2013/0286845 A1* | 10/2013 | Smith, Jr. | H04L 43/0894 370/235.1 |

* cited by examiner

*Primary Examiner* — Fan Ng
*Assistant Examiner* — Rodrick Mak
(74) *Attorney, Agent, or Firm* — Klein, O'Neill & Singh, LLP

(57) ABSTRACT

Methods and systems for a network device. The network device includes a temporary memory storage device having a plurality of storage locations that are used to store packets received by a plurality of sub-ports. The network device includes a cut-through estimation circuit that estimates a cut-through threshold value based on which a certain portion of a packet has to be received and stored at one of the plurality of storage locations before the packet can be processed by one of the sub-ports that received the frame. The cut-through threshold value varies based on an operating speed of a network link the packet is received on, an operating speed of a network link the packet is transmitted on, and a protocol used for receiving and transmitting the packet.

15 Claims, 9 Drawing Sheets

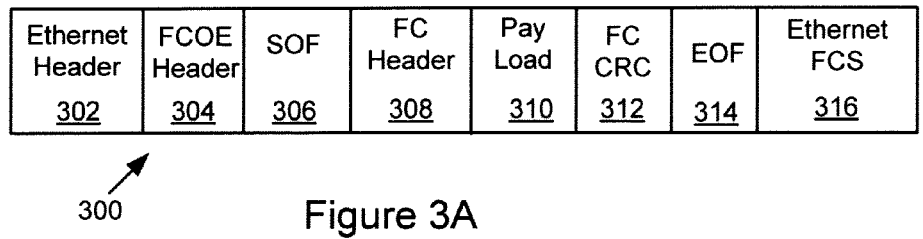
Figure 3A
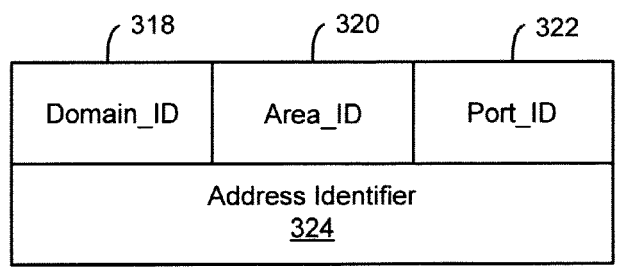
Figure 3B
| Word/Bits | FC Header 308 | | | |
|---|---|---|---|---|
| | 31    24 | 23    16 | 15    08 | 07    00 |
| 0 | R_CTL | D_ID | | 308A |
| 1 | CS_CTL/Priority | S_ID | | 308B |
| 2 | Type | F_CTL | | |
| 3 | SEQ_ID | DF_CTL | SEQ_CNT | |
| 4 | OX_ID | | RX_ID | |
| 5 | Parameter | | | |
Figure 3C

PBUF Cut-Through Shift n,m Values

| Rx Link Rate 452 | Tx Link Rate 454 | | | | | | | | | | | |
|---|---|---|---|---|---|---|---|---|---|---|---|---|
| | 1GE 1 | 2GFC 2 | 4GFC 3 | 8GFC 4 | 10GE 5 | 10GFC 6 | 16GFC 7 | 20GE 8 | 20GFC 9 | 40GE B | 40GFC C | No Cut F |
| 1GE1    | - | 1,4 | 2,5 | 3,6 | 4,5 | 4,5 | 4,7 | 5,6 | 5,6 | 6,7 | 6,7 | - |
| 2GFC2   | - | -   | 1,0 | 2,0 | 3,5 | 3,5 | 3,0 | 4,6 | 4,6 | 5,7 | 5,7 | - |
| 4GFC3   | - | -   | -   | 1,0 | 2,4 | 2,4 | 2,0 | 3,5 | 3,5 | 4,6 | 4,6 | - |
| 8GFC4   | - | -   | -   | -   | 1,3 | 1,3 | 1,0 | 2,4 | 2,4 | 3,5 | 3,5 | - |
| 10GE5   | - | -   | -   | -   | -   | -   | 1,3 | 1,0 | 2,3 | 2,0 | 3,4 | - |
| 10GFC6  | - | -   | -   | -   | -   | 1,2 | 1,2 | 1,7 | 1,0 | 2,0 | 2,0 | - |
| 16GFC7  | - | -   | -   | -   | -   | -   | -   | 1,3 | 1,3 | 2,4 | 2,4 | - |
| 20GE8   | - | -   | -   | -   | -   | -   | -   | -   | 1,2 | 1,0 | 2,3 | - |
| 20GFC9  | - | -   | -   | -   | -   | -   | -   | -   | -   | 1,0 | 1,0 | - |
| 40GEB   | - | -   | -   | -   | -   | -   | -   | -   | -   | -   | 1,2 | - |
| 40GFCC  | - | -   | -   | -   | -   | -   | -   | -   | -   | -   | -   | - |

Figure 4B

CUT-THROUGH ROUTING FOR NETWORK DEVICES

BACKGROUND

1. Technical Field

The present disclosure relates to networks and network devices.

2. Related Art

Networking systems are commonly used to move network information (which may also be referred to interchangeably, as frames, packets or commands) between computing systems (for example, servers) or between computing systems and network devices (for example, storage systems). Various hardware and software components are used to implement network communication.

A network switch is typically a multi-port device where each port manages a point-to-point connection between itself and an attached system. Each port can be attached to a server, peripheral, input/output subsystem, bridge, hub, router, or another switch. The term network switch as used herein includes a Multi-Level switch that uses plural switching elements within a single switch chassis to route data packets. Different network and storage protocols may be used to handle network information and storage information. Continuous efforts are being made to enhance the use of networking and storage protocols.

SUMMARY

The present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment, a network device having a plurality of base-ports, where each base-port is coupled to a plurality of network links and each base-port has a plurality of sub-ports configured to operate independently as a port for sending and receiving information using one of the plurality of network links at a plurality of rates complying with a plurality of protocols is provided. The network device comprises a temporary memory storage device having a plurality of storage locations that are used to store packets received by the plurality of sub-ports; wherein the memory storage device is shared among the plurality of sub-ports such that each sub-port is provided access to one or more storage locations at a certain phase of a system clock cycle for the network device; and a cut-through estimation circuit that estimates a cut-through threshold value based on a certain portion of a packet that has to be received and stored at one of the plurality of storage locations before the packet can be processed by one of the sub-ports that received the frame;

The cut-through threshold value varies based on an operating speed of a network link the packet is received on, an operating speed of a network link the packet is transmitted from, and a protocol used for receiving and transmitting the packet; and the cut-through estimation circuit uses a first value and a second value to shift a maximum packet length for the packet, where the first value and the second value are obtained from a data structure and vary based on the operating speed of the network link the packet is received on and the operating speed of the network link the packet is transmitted on to its destination In another embodiment, a machine implemented method is provided. The method includes receiving a packet at a sub-port from among a plurality of sub-ports of a base port of a network device, where the plurality of sub-ports can be configured to operate at more than one operating speed to process packets complying with different protocols; temporarily storing the packet at a temporary memory storage device having a plurality of storage locations shared among the plurality of sub-ports such that each sub-port is provided access to one or more storage locations within a certain phase of a system clock cycle for the network device; estimating a cut-through threshold value based on which a certain portion of the packet has to be received and stored at one of the plurality of storage locations before the packet can be processed by the network device.

The cut-through threshold value varies based on an operating speed of a network link the packet is received on, an operating speed of a network link the packet is transmitted on and a protocol used for receiving and transmitting the packet. Furthermore, the cut-through threshold value is estimated by using a first value and a second value to shift a maximum frame length for the frame, where the first value and the second value are obtained from a data structure and vary based on the operating speed of the network link the packet is received on and the operating speed of the network link the frame is transmitted on to its destination.

In yet another embodiment, a computing system coupled to a network device is provided. The network device includes a plurality of base-ports, where each base-port is coupled to a plurality of network links and each base-port has a plurality of sub-ports configured to operate independently as a port for sending and receiving information using one of the plurality of network links at a plurality of rates complying with a plurality of protocols; a temporary memory storage device having a plurality of storage locations that are used to store packets received by the plurality of sub-ports; wherein the memory storage device is shared among the plurality of sub-ports such that each sub-port is provided access to one or more storage locations at a certain phase of a system clock cycle for the network device; and a cut-through estimation circuit that estimates a cut-through threshold value based on which a certain portion of a packet has to be received and stored at one of the plurality of storage locations before the packet can be processed by one of the sub-ports that received the frame.

The cut-through threshold value varies based on an operating speed of a network link the packet is received on, an operating speed of a network link the packet is transmitted from and a protocol used for receiving and transmitting the packet. Furthermore, the cut-through estimation circuit uses a first value and a second value to shift a maximum packet length for the packet, where the first value and the second value are obtained from a data structure and vary based on the operating speed of the network link the packet is received and the operating speed of the network link the packet is transmitted to its destination.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The various present embodiments now will be discussed in detail with an emphasis on highlighting the advantageous features. These embodiments depict the novel and nonobvious systems and methods for cut-through routing shown in the accompanying drawings, which are for illustrative purposes only. These drawings include the following figures, in which like numerals indicate like parts:

FIG. 1 is a functional block diagram of a network that the present embodiments may be used in connection with;

FIGS. 3A-3C are examples of frame (or packet, used interchangeably throughout this specification) formats for frames that are routed by the switch element of FIG. 2A;

FIG. 4B is a data structure used by the cut-through circuit of FIG. 4A;

DETAILED DESCRIPTION

Figure 1:
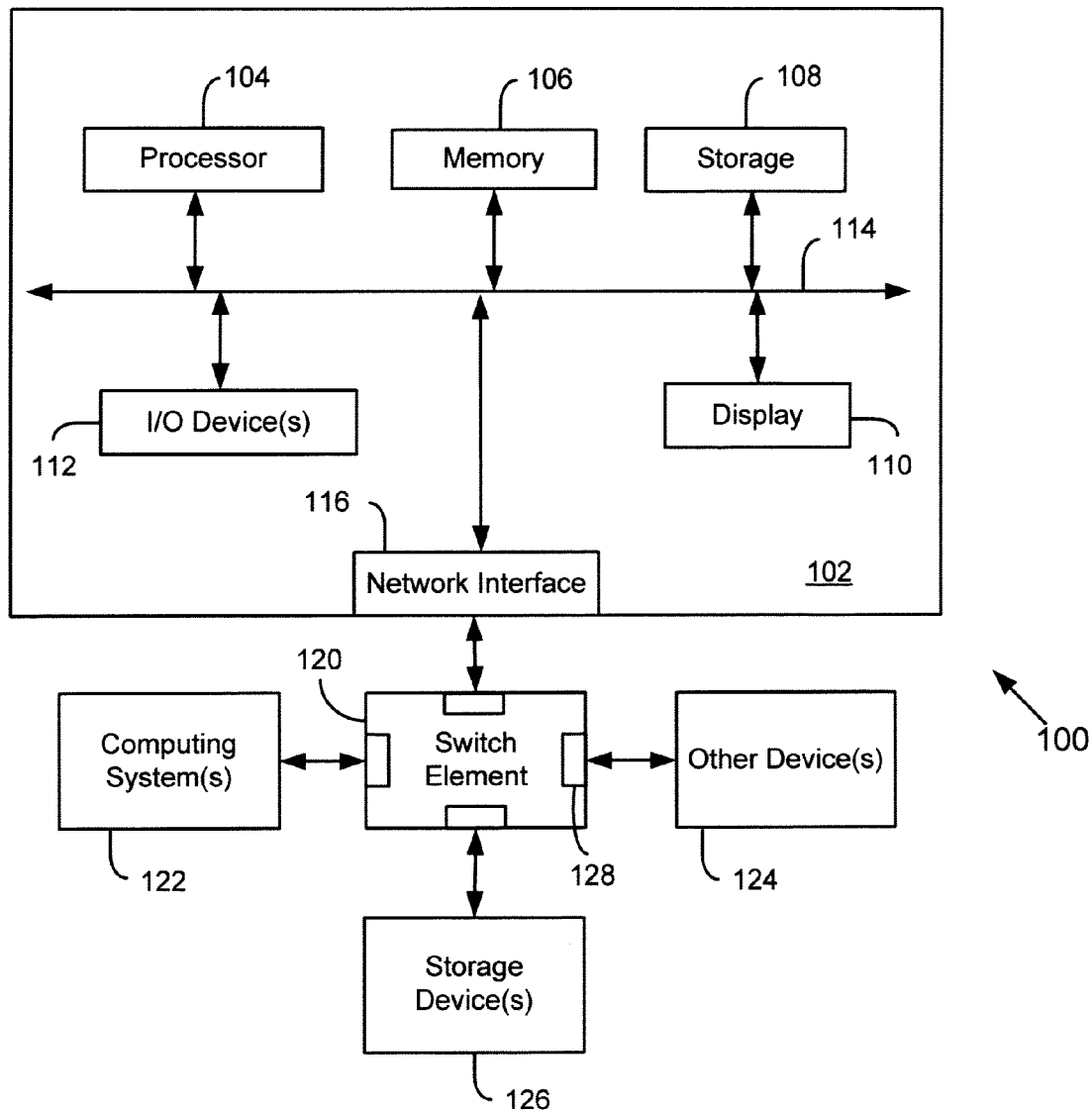

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.).

The embodiments disclosed herein, may be implemented as a computer process (method), a computing system, or as an article of manufacture, such as a computer program product or non-transitory computer-readable media. The computer program product may be computer storage media, readable by a computer device, and encoding a computer program of instructions for executing a computer process.

Various network standards and protocols may be used to enable network communications using the disclosed embodiments, including Fibre Channel (FC), Fibre Channel over Ethernet (FCoE), Ethernet, and others. Below is a brief introduction to some of these standards. The present embodiments are described herein with reference to the Fibre Channel, FCoE and Ethernet protocols. However, these protocols are used merely for ease of reference and to provide examples. The present embodiments are not limited to Fibre Channel, FCoE and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral. I/O subsystem, bridge, hub, router, or even another switch. A switch receives messages from one port and routes them to other ports. Fibre Channel switches use memory buffers to hold frames received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual packets called frames. Each frame contains source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

FIG. 1 illustrates an example of a system 100 that may be used in connection with the present embodiments. System 100 may include a computing system 102, which may be referred to as a host system. A typical host system 102 includes several functional components, including a central processing unit (CPU) (also referred to as a processor or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114.

The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch 120 and various links. The network interface 116 may comprise a network interface card (NIC) or any other device for facilitating communication between the host system 102, other computing systems 122, storage devices 126, and other devices 124. The network interface 116 may include a converged network adapter, such as that provided by QLogic Corporation for processing information complying with storage and network protocols, for example, Fibre Channel and Ethernet. As an example, the network interface 116 may be a FCoE adapter. In another embodiment, the network interface 116 may be a host bus adapter, for example, a Fibre Channel host bus adapter, such as that provided by QLogic Corporation. Details regarding the network interface 116 are not provided since they are not germane to the inventive embodiments described herein.

In one embodiment, the processor 104 of the host system 102 may execute various applications, for example, an e-mail server application, databases, and other application types. Data for various applications may be shared between the computing systems 122 and stored at the storage devices 126. Information may be sent via switch 120 ports. The term port as used herein includes logic and circuitry for receiving, processing, and transmitting information.

Each device (e.g. the host system 102, the computing systems 122, the storage devices 126, and the other devices 124) may include one or more ports for receiving and transmitting information, for example, node ports (N_Ports). Fabric ports (F_Ports), and expansion ports (E_Ports). Node ports may be located in a node device, e.g. network interface 116 of the host system 102 and an interface (not shown) for the storage devices 126. Fabric ports are typically located in Fabric devices, such as the switch 120. Details regarding the switch 120 are provided below.

Figure 2A:
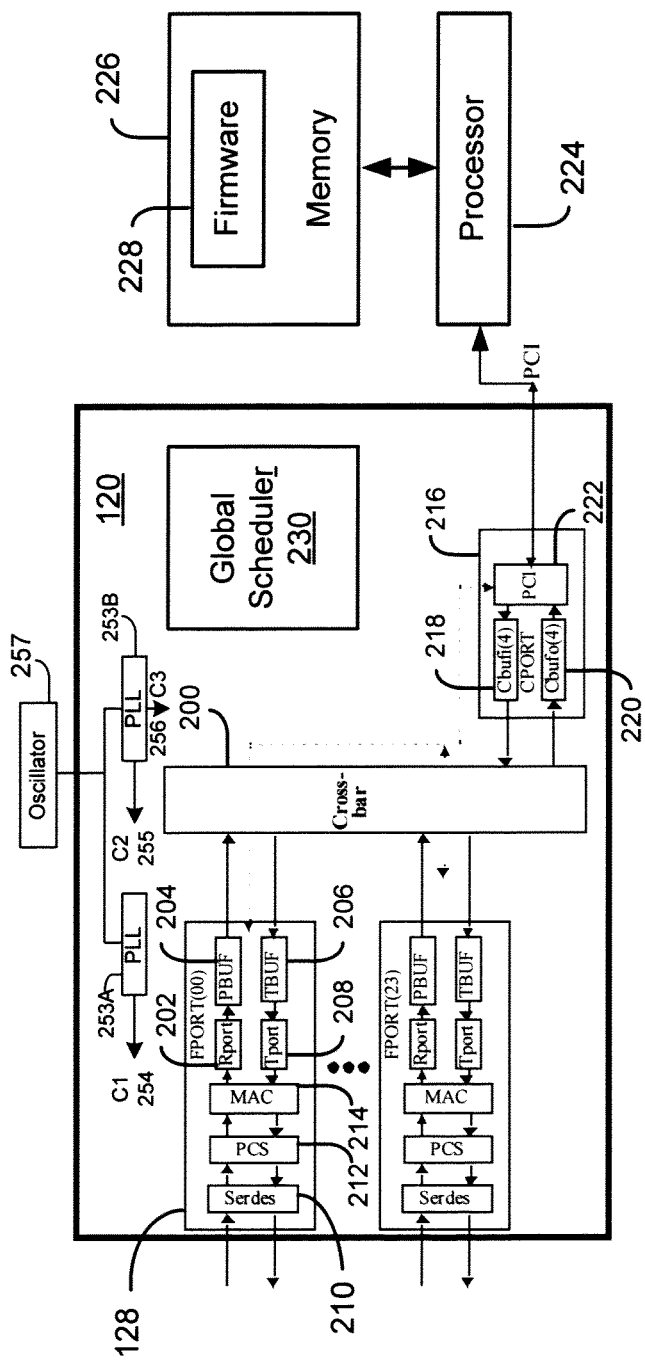
FIG. 2A is a functional block diagram of a switch element according to the present embodiments.

FIG. 2A is a high-level block diagram of switch element 120, also referred to as the switch 120 having a plurality of ports 128. Switch element 120 may be implemented as an application specific integrated circuit (ASIC). Switch element 120 may have a plurality of ports 128. Ports 128 are generic (GL) ports and may include an N_Port, F_Port, FL_Port, E_Port, or any other port type. The ports 128 may be configured to operate as Fibre Channel, FCoE or Ethernet ports. In other words, depending upon what it is attached to, each GL port can function as any type of port. As an example, ports 128 of FIG. 2A are drawn on the same side of the switch element 120. However, the ports 128 may be located on any or all sides of switch element 120. This does not imply any difference in port or ASIC design. The actual physical layout of the ports will depend on the physical layout of the ASIC.

Ports 128 communicate via a time shared crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate the ports 128 plus a port 216 for connection to a processor 224 that may be external to the switch element 120. In another embodiment, the processor 224 may be located within a switch chassis that houses the switch element 120.

Each port 128 receives incoming frames (or information/packets) and processes the frames according to various protocol requirements. The port 128 includes a shared, time multiplexed pipeline for receiving frames (or information). The pipeline includes a serializer/deserializer (SERDES) 210, a physical coding sub-layer (PCS) 212, and a time multiplexed media access control (MAC) sub-layer 214.

The SERDES 210 receives incoming serial data at clock C1 254 or C2 255 generated by phase lock looped device (PLL) 253A and converts it to parallel data. The parallel data is then sent to the PCS 212 for processing. The data is read from PCS 212 at clock C3 256 i.e. the system clock generated by PLL 253B. An external oscillator 257 provides a reference clock to PLLs 253A and 253B. The data from PCS 212 is sent to MAC 214 before being sent to a receive segment (or receive port (RPORT) 202.

The RPORT (or receive segment) 202 temporarily stores received frames at a memory storage device, shown as PBUF (pause buffer) 204. The frames are then sent to a transmit segment (or transmit port (TPORT) 208 via the crossbar 200. The TPORT 208 includes a memory device shown as a transmit buffer (TBUF)) 206. The TBUF 206 may be used to stage frames or information related to frames before being transmitted. The TPORT also includes a shared MAC and PCS. The SERDES at TPORT is used to convert parallel data into a serial stream.

The switch element 120 may also include a control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 may be used to store firmware instructions 228 for controlling switch element 120 operations.

The CPORT 216 includes an input buffer (CBUFI) 218, which is used to transmit frames from the processor 224 to the ports 128. The CPORT 216 further includes an output buffer (CBUFO) 220, which is used to send frames from the PBUFs 204, the TBUFs 206, and CBUFI 218 that are destined to processor 224.

Port 128 described above may be referred to as a "base-port" that may have more than one network link available for receiving and transmitting information. Each network link allows the base-port to be configured into a plurality of sub-ports, each uniquely identified for receiving and sending frames. The configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, 1 double lane Ethernet port and two single lane Ethernet ports, one double lane Ethernet port, one single lane Ethernet port and one single lane Fibre Channel port, one double lane Ethernet port and two single lane Fibre Channel port, one four lane Ethernet port or one four lane Fibre Channel port. Port 128 uses some logic that is shared among the multiple sub-ports and some logic that is dedicated to each sub-port.

Figure 2B:
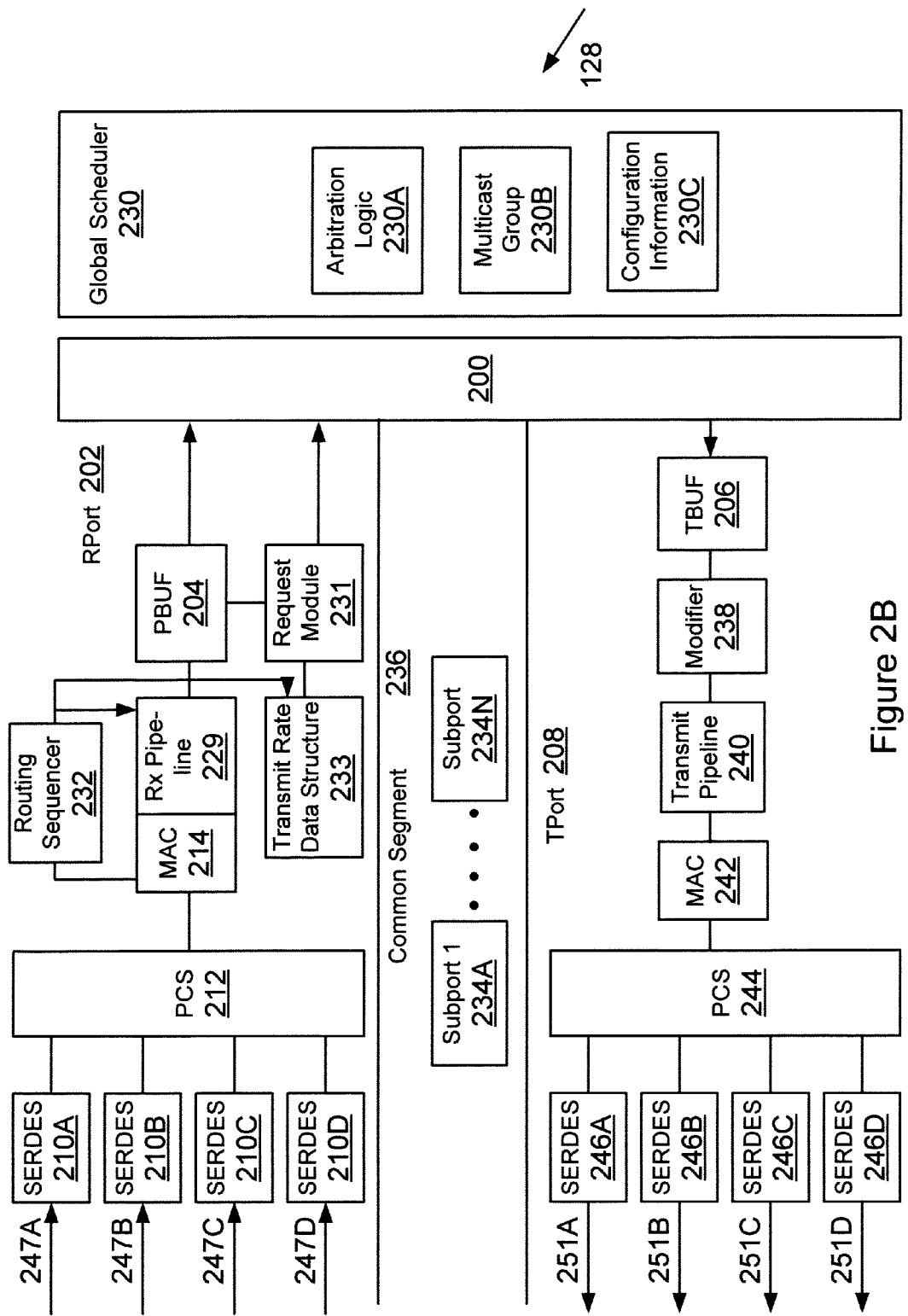
FIGS. 2B-2C are functional block diagrams of a receive segment, according to one embodiment.

FIG. 2B illustrates an example of base-port 128 having RPORT 202, TPORT 208 and a common segment 236, according to one embodiment. RPORT 202 is used for receiving and processing frames, while TPORT 208 is used for transmitting frames. Common segment 236 is used to store configuration and status information that may be commonly used among different components of base-port 128.

In one embodiment, base-port may be configured to include a plurality of sub-ports. The configuration, status and statistics information/logic 234A-234N for each sub-port may be stored in common segment 236. The configuration logic 234A-234N may include look up tables or other data structures for storing configuration information.

RPORT 202 may include or have access to a plurality of network links, for example, four independent physical network links (or lanes) 247A-247D, each configured to operate as a portion of an independent sub-port within base-port 128. Each network link is coupled to a SERDES 210-210D that share PCS 212 and MAC 214. The multiple lanes also share a receive pipeline 229 that is used for pre-processing received frames before they are transferred. Both MAC 214 and receive pipelines 229 are time multiplexed so that they can be shared among the plurality of links based on how the ports are configured to operate.

Incoming frames are received via one of the network links 247A-247N. The received frame is processed by the appropriate SERDES and then sent to the PCS 212. After PCS 212 processes the frame, the frame is provide to MAC 212 that is also time shared among a plurality of sub-ports. This means that for a certain time segment (for example, clock cycles), MAC 214 may be used by one of the sub-ports. After the MAC 214 processes the frame it is sent to receive pipeline 229 that is also time shared. MAC 214 and PCS 212 may be a part of pipeline 229.

Information regarding the frame or a copy of the frame is also provided to a routing sequencer 232 that determines the destination of the received packets. In one embodiment, a frame whose destination is processor 224 is given the highest priority, followed by a frame that is routed by a TCAM (ternary content addressable memory) or steering registers located within the routing sequencer 232. More than one routing sequencer may be used for each base-port 128. Frames that are ready to be sent out are then staged at PBUF 204. PBUF 204 may have a plurality of queues that may be referred to as receive queues. The receive queues temporarily store frames, until a request to move the frame is granted.

To move frames from the receive queues; a request module 231 generates requests for a global scheduler 230, also referred to as scheduler 230. Request module 231 maintains a data structure (not shown) that tracks a number of requests that may be pending for each sub-port. Request module 231 also removes requests from the data structure when a grant is received for a particular request.

Scheduler 230 stores configuration information 230C for various ports and some of that information may be used to select requests. Scheduler 230 includes arbitration logic 230A that performs dual stage arbitration for requests from various base-ports. Scheduler 230 also maintains a data structure at a memory labeled as multicast group 230B. The data structure stores information for identifying multicast groups that may receive multicast frames i.e. frames that are destined to multiple destinations.

Frames for transmission via TPORT 208 move via TBUF 206 and a modifier 238. In one embodiment, modifier 238 may be used to insert or remove information from an outgoing frame. The modification is based on the frame type. The time shared transmit pipeline 240 and MAC 242 are used to process outgoing frames. PCS 244, SERDES 246A-246D are used similar to PCS 212 and SERDES 210A-210D. Network links 251A-251D are similar to links 247A-247D, except links 251A-251D are used to transmit frames. Although separate PCS and MACs are shown for TPORT, the same PCS and MAC i.e. 212 and 214 of RPORT 202 may be used for the TPORT 208

Figure 2C:
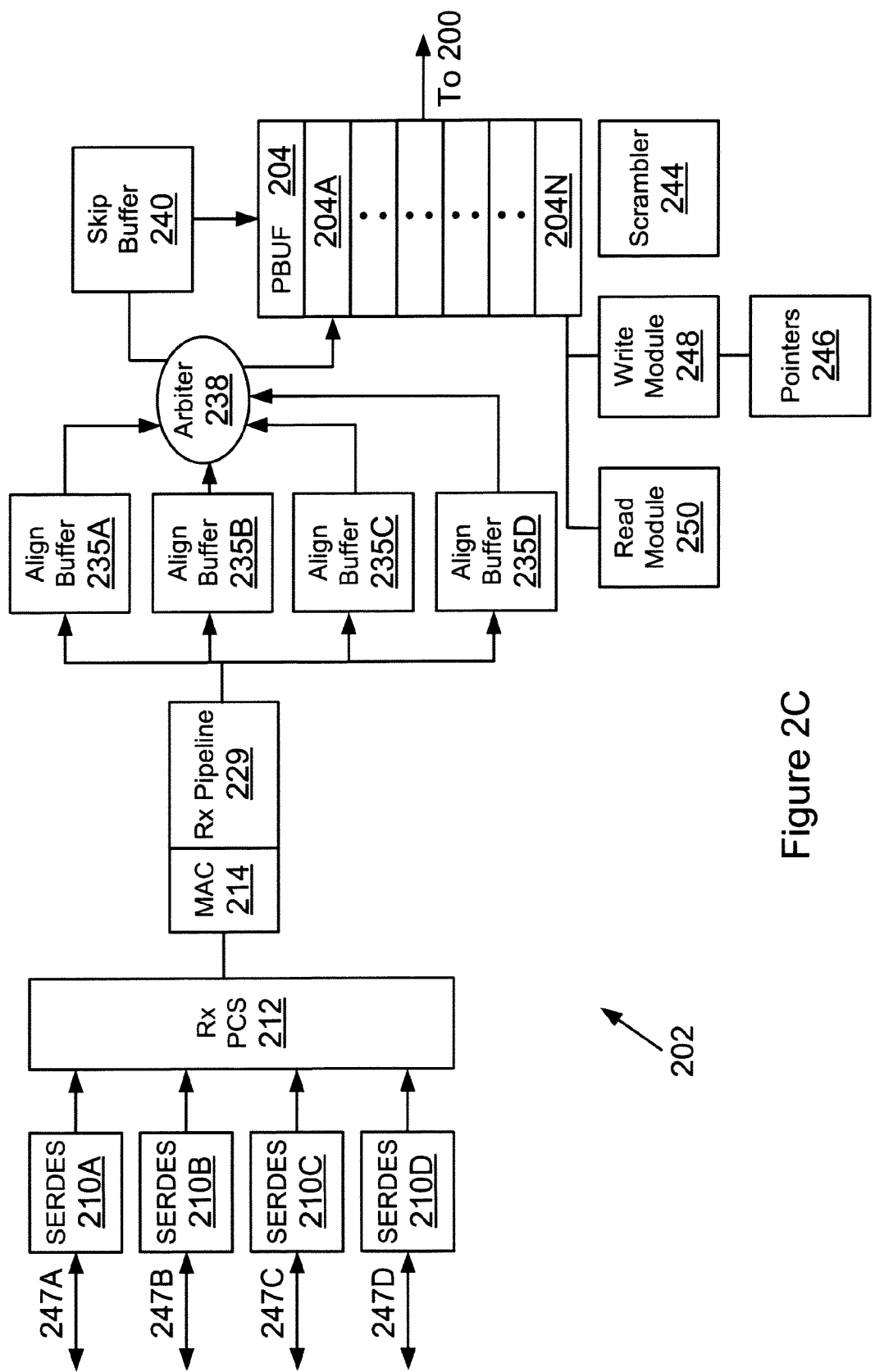

FIG. 2C illustrates an example of RPORT 202 of base-port 128, according to one embodiment. RPORT 128 may be coupled to four independent physical network links 247A-247D, each configured to operate as a portion of an independent sub-port. Each network link is coupled to one of the SERDES 210-210D, which share PCS 212 and MAC 214. The multiple lanes also share a receive pipeline 229 that is used for pre-processing received frames before they are transferred. Both MAC 214 and receive pipelines 229 are time multiplexed so that they can be shared among the plurality of links based on how the ports are configured to operate. PCS 212 and MAC 214 may be a part of receive pipeline 229.

RPORT 202 includes a plurality of align buffers 235A-235D that are used for staging frames before they can be stored at a skip buffer 240 or a shared PBUF 204, as described below in detail. In one embodiment, the align buffers 235A-235D are dedicated to each network lane 247A-247D. In another embodiment, the align buffers 235A-235D may be shared among the different lanes. Align buffers hold a frame until a current frame write operation is complete. The align buffers 235A-235D may also hold a frame, in case the skip buffer 240 has reached its threshold.

Frames are selected from the align buffers 235A-235D by an arbitration module (arbiter) 238. In one embodiment, PBUF 204 may be a dynamic random access memory (DRAM) device. PBUF 204 may include a plurality of storage locations 204A-204N (may also be referred to as slots) for storing frames.

RPORT 202 includes a read module 250 for controlling and managing read operations from PBUF 204. The read operation may be performed across multiple time slices. The read module 250 knows which lane and which queue the data has been written from. The read module 250 is also aware of the start of a frame (SOF) so it knows when to rollover a read counter maintained by the read module 250. The read address is compared with the write address to ensure that it does not exceed the write address for a cut-through frame. If the read address is ever equal to the write address the read is delayed. This address check is performed even when the write packet data is contained in the Skip Buffer 240 due to PBUF memory bank conflicts. The received packet data has not yet been written into the PBUF memory and is not available to be read. The cut-through calculation has been adjusted to account for the possible delay in the Skip Buffer 240. This adjustment is performed when a receive link rate is equal to the transmit link rate and cut-through is activated.

RPORT 202 further includes a write module 248 that controls writing to storage locations 204A-204N. Pointers 246 are maintained by write module 248 indicating where information is stored at PBUF 204 or skip buffer 240.

RPORT 202 includes a scrambler module 244 for scrambling address locations of PBUF 204 that are used for writing a frame at PBUF 204. The address is scrambled before a next frame is received. One reason for scrambling the address is to reduce bank conflict for accessing a storage location.

The skip buffer 240 may be used to prevent bank contention at PBUF 204. For example, if skip buffer has 16 slots and 10 of them become full, then the skip buffer 204 may send a signal to global scheduler 230 to prevent additional read operations by stopping more grants from being issued.

FIG. 3A illustrates an example of an FCoE packet format 300 that can be processed and routed by switch element 120, according to the present embodiments. The FCoE packet 300 includes an Ethernet header 302. In one embodiment, the Ethernet header 302 may be 14 bytes in length, for example. The FCoE packet 300 also includes an FCoE header 304 that includes the Ethernet type and version information. A start of frame (SOF) 306 indicates the beginning of a frame and may be 1 byte, for example.

The FCoE packet 300 may also include a Fibre Channel header (FC Header) 308 that may be 24 bytes long with a payload 310. The Fibre Channel cyclic redundancy code (CRC) 312 may be 4 bytes and the end of frame (EOF) 314 may be 1 byte in size. The EOF 514 indicates the end of a frame. The Ethernet FCS 316 is inserted after the EOF 514.

FIG. 3B illustrates a standard 24-bit Fibre Channel address identifier 324 used by switch element 120. The address identifier 324 includes a Domain_ID 318, an Area_ID 320, and a Port_ID 322. The Domain_ID 318 is a Domain identifier based on the upper 8-bits of the 24-bit Fibre Channel address. A Domain includes one or more Fibre Channel switches that has the same Domain_ID for all N_Ports and NL_Ports within or attached to the switches. If there is more than one switch in the Domain, then each switch within the Domain is directly connected via an Inter-Switch Link to at least one other switch in the same Domain.

The Area_ID 320 is an Area identifier based on the middle 8 bits of the 24-bit Fibre Channel address. The Area_ID 320 applies either to (a) one or more N_Ports within and attached to a Fibre Channel switch, or (b) to an Arbitrated Loop of NL_Ports attached to a single FL_Port.

The Port_ID 322 is the lower 8-bits of a Fibre Channel address. The Port_ID 322 applies to either (a) a single N_Port or virtualized N_Port within a Domain/Area, or (b) the valid AL_PA of a single NL_Port or FL_Port on an Arbitrated Loop.

FIG. 3C illustrates an example of the FC header 308 of FIG. 3A. The following frame header fields that may be used by switch element 120 are:

D_ID 308A-A 24-bit Fibre Channel frame header field that contains the destination address for a frame; and S_ID 308B-A 24-bit Fibre Channel frame header field that contains the source address for a frame.

In one embodiment, switch 120 may use cut-through routing to route incoming frames. Cut-through routing means that a complete frame does not need to have completely landed in PBUF 204, before it can be processed and transmitted. When a certain portion of a frame has landed, it can be processed, if it meets a cut-through threshold value. The threshold value may vary based on the link rate(s) of the receive side links (247A-247D) and the transmit side links 251A-251D, as well as the protocol that is used. For example, a 10G (gigabits/second) Ethernet link is not the same bandwidth as a 10G Fibre Channel link: the 10G Fibre Channel link is faster. The protocol is also a factor in determining the maximum length data packet. For example, if jumbo Ethernet packets are permitted then the maximum size Ethernet data packet is larger than the maximum length Fibre Channel packet.

Cut-through routing is a challenge for a switch 120 having a plurality of base-ports where each base-port has a plurality of sub-ports sharing time-multiplexed resources. For example, a receive sub-port may be receiving data at 1G, and a transmit port may be transmitting the data at 40G, or vice-versa. To accommodate the different operating rates and protocols, an efficient cut-through circuit 400, according to one embodiment is provided and described below with respect to FIG. 4A.

The cut-through circuit 400 (may also be referred to as circuit 400) may be located at PBUF request module 231 (FIG. 2B). Circuit 400 may be implemented in hardware to determine what portion of a frame needs to be received at RPORT 202 before it can be transmitted. The portion of the frame depends on how a particular sub-port is configured, the link rate and protocol of the sub-port, and the link rate and protocol at which the transmit link operates. In one embodiment, circuit 400 avoids complex division when the operating receive and transmit link rates are not an integer multiple of each other.

Figure 4A:
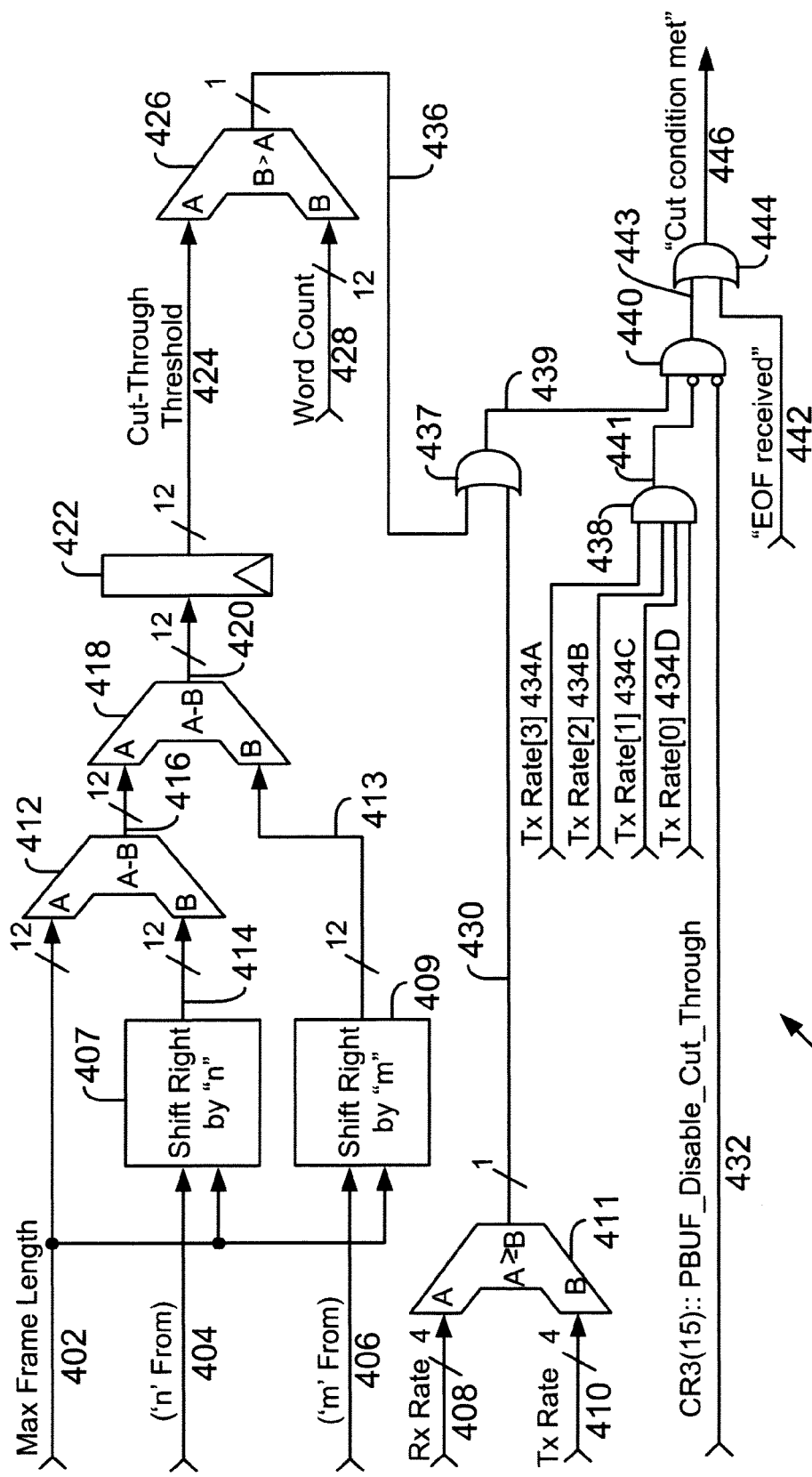
FIG. 4A is a functional block diagram of a cut-through circuit, according to one embodiment.

As shown in FIG. 4A, circuit 400 has various logic components, for example, 407, 409, 411, 412, 418, 426 that receive various inputs for generating a signal 446 that indicates whether a "cut condition" has been met. The term cut condition, as used herein, means a portion of the frame that has been received at RPORT 202 so that the frame can be processed and transmitted to its destination. Details regarding the various inputs and the compare modules are provided below in detail. In the present embodiment, there may be a copy of circuit 400 for each sub-port of base-port 128. In another embodiment the cut-through calculation circuit 400 is time-division multiplexed and shared by multiple sub-ports.

A maximum frame length value 402 is input to logic 412. This value may be programmable and stored at a memory location that is accessible to PBUF request module 231 and other blocks within the base-port. The maximum frame length value may come from a content addressable memory (CAM) structure that uses fields from the received data packet as the search key. The maximum frame length value 402 is based on Fibre Channel and Ethernet standards regulated by IEEE organizations. The exact value used may be different for each sub-port. These values may be part of an exchange of information between link partners during the early stages of link initialization.

A first adjustment value 404 that is based on a value "n" may be obtained from data structure 450 shown in FIG. 4B and described below in detail. The first adjustment value 404 is shifted by logic 407 that provides an output 414. The output 414 is then input to logic 412 that subtracts the output value 414 from maximum frame length 402. Logic 412 then generates an output 416. A similar process is used to handle a second adjustment value 406 that is shifted by logic 409 to generate an output 413. The output 413 is then subtracted from output 416 by logic 418 to generate an output 420 that is provided to logic 422 to generate an estimate of a cut-through threshold value 424. When the n or m value is zero, then it is treated as a special case. If the shift input n or m is zero, then block 409 will output a value of zero not a value of the maximum frame length 402 shifted to the right zero places. In another embodiment, additional adjustment values are used to increase the accuracy of the estimated cut-through threshold value.

The cut-through threshold value 424 is compared with a word count 428 by logic 426. An output 436 is generated when the word count 428 is greater than the cut-through threshold value 426. The word count 428 is a count of a number of words of a current packet (or frame) that may have been received at any given time at a given sub-port. Output 436 is sent to an OR gate 437 that also receives an input from logic 411.

Logic 411 compares a receive link rate 408 with a transmit rate 410. The transmit link rate of the destination port is stored at a transmit rate data structure (for example, a table) 233 shown in FIG. 2B. This data structure is loaded by the processor 224 and readable by the cut-through calculation circuit 400. Output 430 is generated when the receive rate 408 is greater than or equal to the transmit rate 410. The OR gate 437 generates an output 439 that is input to an AND gate 440. The AND gate 440 also receives an input 441 that is output from gate 438. Output 441 is based on a plurality of inputs 434A-434D that are input to AND gate 438.

Inputs 434A-434D are based on the value read from the transmit rate data structure 233. If the value read is the special code, for example 0xF, cut-through operation is disabled for data packets with that port's destination. When cut-through is forced inactive, the frame processing will be done in a store and forward processing method. In a store and forward process, a complete frame has to land in PBUF 204 before it is sent to the crossbar 200 and then the destination transmit port. The transmit rate data structure 233 values are shown in data structure 450 as part of the row and column headers. These values range from 0x1 to 0xF. More values may be needed if more link rates are supported.

Values 441, 439 are provided to AND gate 440 that also receives another input 432 that is used to enable or disable the cut-through process. If cut-through is enabled, then an output 443 is sent to OR gate 444. The OR gate 444 also receives an input 442 indicating if an end of frame has been received. If either condition 442 or 443 is true, then the output 446 is generated to indicate that the cut condition for a particular frame has been met. This indicates to the PBUF request module 231 that the portion of the frame in PBUF 204 is ready for transmission and/or processing.

As shown above, circuit 400 uses subtraction to account for the variation between receive and transmit link rates. Complex division is not used or needed, especially when the link rates are not integer multiples of each other.

FIG. 4B illustrates an example of a data structure 450 that may be used to provide the values n and m used by circuit 400 for the subtraction from the maximum frame length, as described above. These values are calculated such that cut-through routing can be implemented even though there may be a disparity between receive and transmit link rates. Data structure 450 may include a column 452 for storing the link rate for the receive side, for example, the link rate for links 247A-247D. A receive side sub-port may be configured to operate as 1G Ethernet port (1GE), 2G Fibre Channel port (2GFC), 4GFC, 10GE, 10GFC, 16GFC, 20GE, 20GFC, 40GE, or 40GFC. The transmit link rates are in row 454. Similar to the receive side, the transmit side links 251A-251D may be configured to operate as 1GE, 2GFC, 4GFC, 10GE, 10GFC, 16GFC, 20GE, 20GFC, 40GE, or 40GFC.

The n and m values depend on the receive side and transmit side link rates. For example, when 1GE receives frames and a 2GFC is the transmit link, then n is equal to 1 and m is equal to 4. When a receive port is operating as 2GFC and the transmit port is operating at 10GE, then n is equal to 3 and m is equal to 5. The n and m values are chosen to reduce errors between the estimated cut-through threshold value calculated by circuit 400 and the true data packet rate ratio between the receive and transmit links. The n and m values are chosen so as not to allow the estimated cut-through threshold to be less than the actual data rate ratio. The n and m values could be generated using a computer algorithm, details of which are not germane to the embodiments disclosed herein. Data structure 450 only needs to be computed once for the supported link rates. The n and m values are used for inputs 404, 406, as described above with respect to FIG. 4A.

Figure 4C:
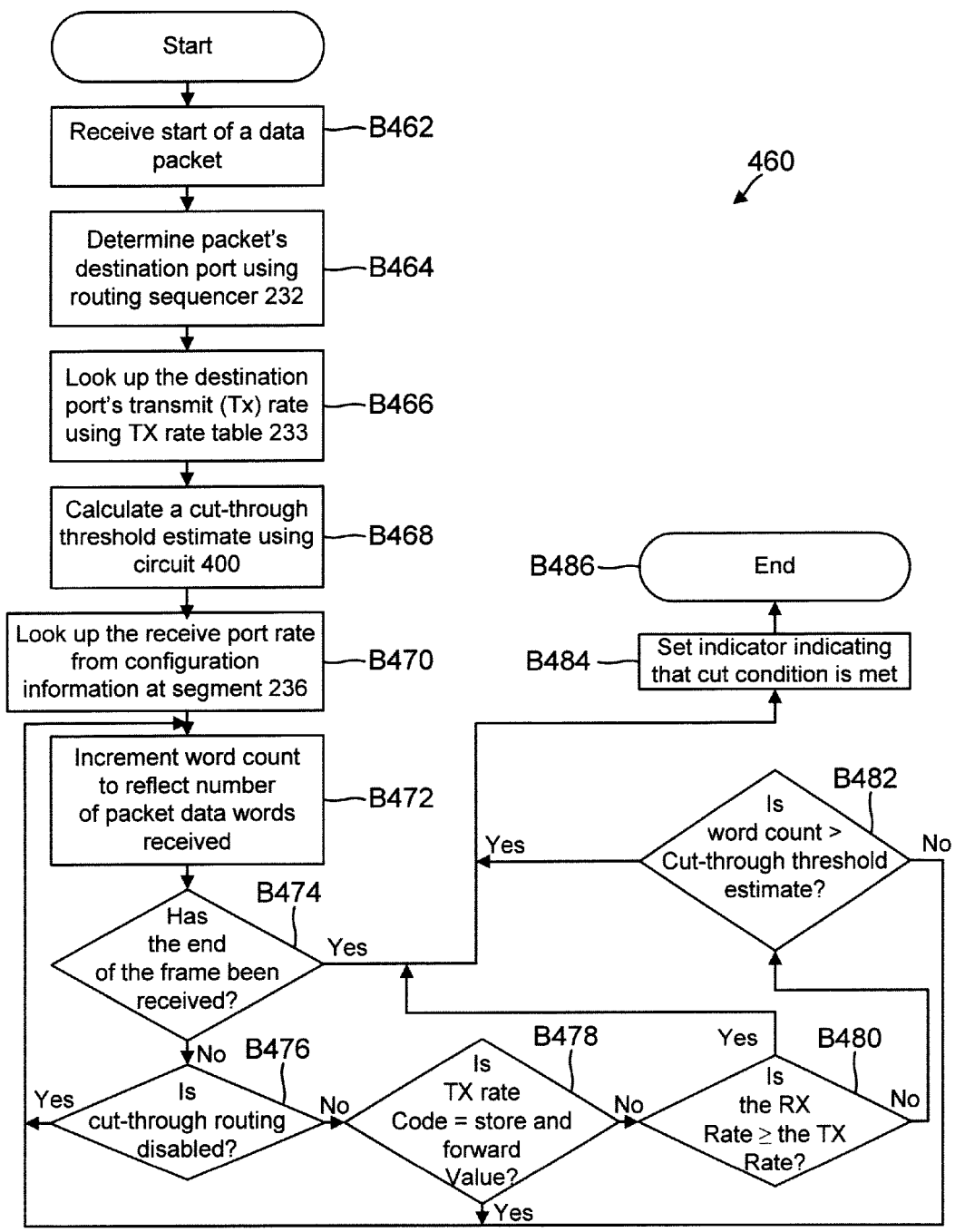
FIG. 4C is a flowchart illustrating a method of using the cut-through circuit, of FIG. 4A according to one embodiment.

FIG. 4C illustrates a process 460, according to one embodiment. The process begins in block B462, when a start of a frame (or data packet) is received at a sub-port of base-port 128. The packet's destination port is first determined by the routing sequencer 232. In block B466, the transmit rate of the destination port is looked up from the transmit rate data structure 233. In block B468, an estimate of the cut-through threshold value is determined using the circuit 400, described above in detail. In block B470, the rate for the port receiving the packet is looked up from the configuration information stored at the common segment 236. In block B472, the word count maintained at the receive port is increased to reflect the packet data words that have been received.

In block B474, the port determines if the end of the frame (or packet) has been received. If yes, the process moves to block B484, otherwise in block B476, the process determines if cut-through routing has been disabled. If yes, then the process moves back to block B472. If not, then in block B478, the process determines if the transmit rate code is equal to a code for "store and forward" routing, i.e., receiving the entire frame and then routing. If the answer is yes, then the process moves back to block B472. If not, then in block B480, the process determines if the receive rate is greater than the transmit rate. If yes, then the process moves to block B484, described below. If the receive rate is less than the transmit rate, then in block B482, the process determines if the word count has reached the estimate of the cut-through threshold value. If not, the process moves back to block B472.

If the answer to the query in block B482 is yes, then the process moves to block B484. Furthermore, if the answer is yes in block B474, the process moves to block B484. In block B484, the process determines that the cut condition has been met and the process then ends in block B486.

Figure 5:
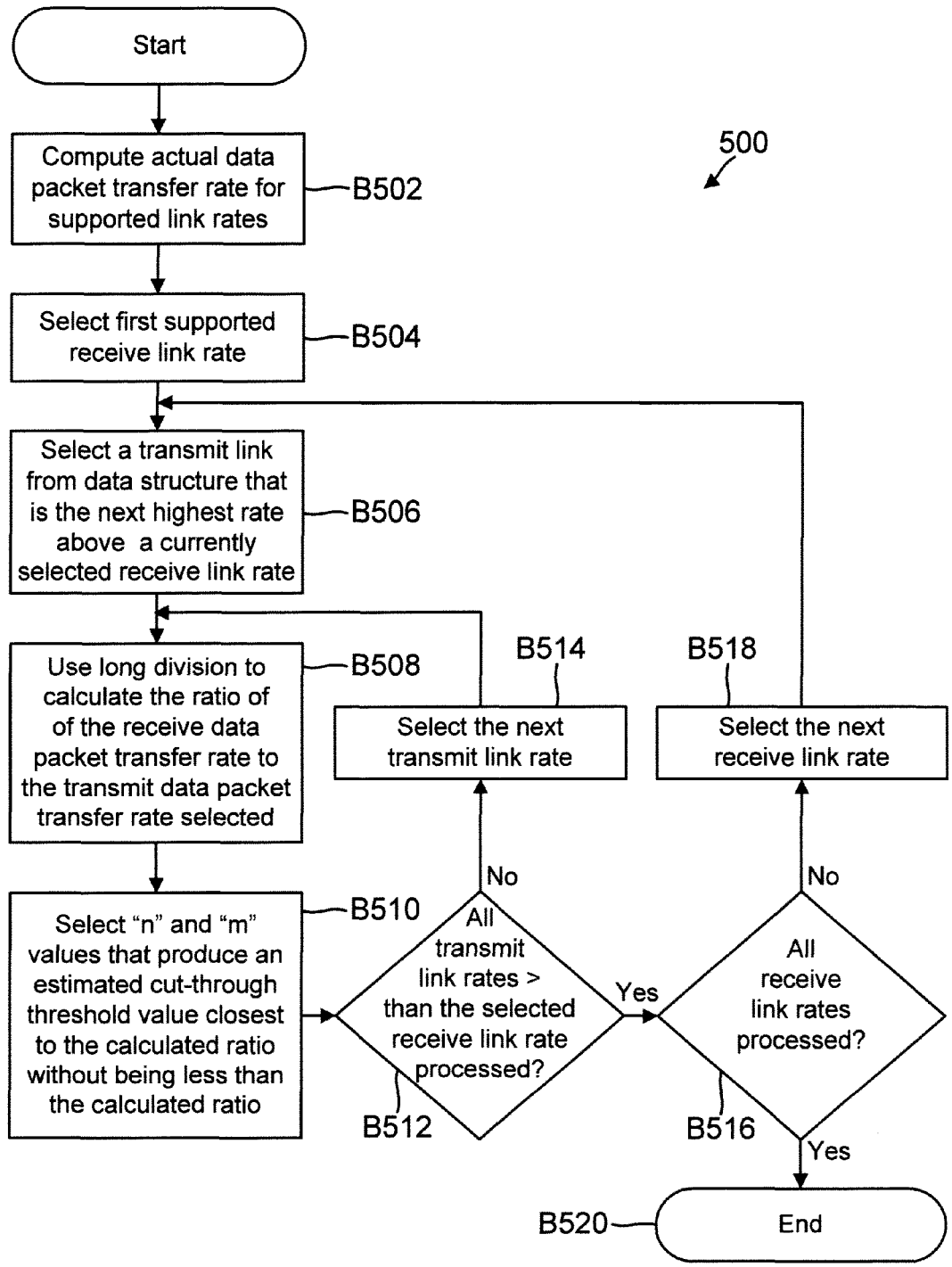
FIG. 5 is a flowchart illustrating one embodiment of a method for determining "n" and "m" values in the data structure of FIG. 4B.

FIG. 5 illustrates a process 500 for determining the n and m values, according to one embodiment. The process begins in block B502, when the actual data packet transfer rate is determined for all supported link rates. In block B504, the first support receive link rate 452 is selected. In block B506, a transmit rate that is the next highest than the selected receive link rate is selected. Thereafter, in block B508, the ratio of the receive data packet transfer rate and the transmit data transfer packet rate is determined, for example, by using long division. In block B510, n and m values are selected to provide an estimated cut-through threshold value that is closest to the calculated ratio.

In block B512, the process determines if all transmit link rates are greater than the selected receive link rate that was processed by the blocks described above. If not, then the next transmit link rate is selected in block B514 and the process moves to block B508. If the transmit link rate is greater than the receive link rate, in block B512, then in block B516 the process determines if all the receive link rates have been processed. If not, then the process moves to block B518 where the next receive link rate is selected and the process moves to block B506. If all link rates have been processed, in block B516, then the process ends in block B520.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the embodiments disclosed above are applicable to any network device, for example, adapters, routers and others. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A network device, comprising:
a plurality of base-ports, where each base-port is coupled to a plurality of network links and each base-port has a plurality of hardware based sub-ports configured to operate independently as a port for sending and receiving information using one of the plurality of network links at a plurality of rates complying with a plurality of protocols; wherein each sub-port is coupled to a network link from among the plurality of network links;
a temporary memory storage device at each base-port having a plurality of storage locations that are used to store packets received by the plurality of sub-ports; wherein the memory storage device is shared among the plurality of sub-ports of a base-port such that each sub-port is provided access to one or more storage locations at a certain phase of a system clock cycle for the network device;
a cut-through estimation circuit at each base-port that estimates a cut-through threshold value based on a certain portion of a packet that has to be received and stored at one of the plurality of storage locations before the packet is processed by one of the sub-ports that received the frame;
wherein the cut-through threshold value is determined based on an operating speed of a receive network link the packet is received on, an operating speed of a transmit network link the packet is transmitted on, and a protocol used by a sub-port for receiving and transmitting the packet;
wherein to determine the cut-through threshold value, the cut-through estimation circuit uses a first value and a second value to shift a maximum packet length for the packet, where the first value and the second value are obtained from a data structure and vary based on the operating speed of the network link the packet is received on and the operating speed of the network link the packet is transmitted on to its destination; and
wherein the cut-through estimation circuit uses subtraction for estimating the cut-through value without using division when the operating speed of the receive network link the packet is received on and the operating speed of the transmit network link the packet is transmitted on are non-integer multiples.

2. The network device of claim 1, wherein the network device is a switch coupled to one or more devices.

3. The network device of claim 1, wherein one of the plurality of sub-ports is configured to operate as a Fibre Channel port.

4. The network device of claim 1, wherein one of the plurality of sub-ports is configured to operate as an Ethernet or Fibre Channel over Ethernet port.

5. The network device of claim 1, wherein the cut-through estimation circuit is shared by the plurality of sub-ports.

6. A machine-implemented method, comprising:
receiving a packet at a sub-port from among a plurality of hardware based sub-ports of a base port of a network device, where the plurality of sub-ports can be configured to operate at more than one operating speed to process packets complying with different protocols and each sub-port is coupled to a network link from among a plurality of network links;
temporarily storing the packet at a temporary memory storage device of a base-port having a plurality of storage locations shared among the plurality of sub-ports of the base-port such that each sub-port is provided access to one or more storage locations within a certain phase of a system clock cycle for the network device;
estimating a cut-through threshold value based on which a certain portion of the packet has to be received and stored at one of the plurality of storage locations before the packet can be processed by the network device;
wherein the cut-through threshold value varies based on an operating speed of a receive network link the packet is received on, an operating speed of a transmit network link the packet is transmitted on, and a protocol used by a sub-port for receiving and transmitting the packet;

wherein the cut-through threshold value is estimated by using a first value and a second value to shift a maximum frame length for the frame, where the first value and the second value are obtained from a data structure and vary based on the operating speed of the network link the packet is received on and the operating speed of the network link the frame is transmitted on to its destination; and wherein the cut-through threshold value is estimated using at least one subtraction operation without using a division operation when the operating speed of the receive network link the packet is received on and the operating speed of the transmit network link the packet is transmitted on are non-integer multiples.

7. The method of claim 6, wherein the network device is a switch coupled to one or more devices.

8. The method of claim 6, wherein one of the plurality of sub-ports is configured to operate as a Fibre Channel port.

9. The method of claim 6, wherein one of the plurality of sub-ports is configured to operate as an Ethernet or Fibre Channel over Ethernet port.

10. The method of claim 6, wherein the cut-through threshold value is estimated by a cut-through estimation circuit that is shared by the plurality of sub-ports.

11. A system, comprising:
a computing system coupled to a network device, the network device, comprising
a plurality of base-ports, where each base-port is coupled to a plurality of network links and each base-port has a plurality of hardware based sub-ports configured to operate independently as a port for sending and receiving information using one of the plurality of network links at a plurality of rates complying with a plurality of protocols; wherein each sub-port is coupled to a network link from among the plurality of network links;
a temporary memory storage device at each base-port having a plurality of storage locations that are used to store packets received by the plurality of sub-ports; wherein the memory storage device is shared among the plurality of sub-ports of a base-port such that each sub-port is provided access to one or more storage locations at a certain phase of a system clock cycle for the network device;
a cut-through estimation circuit at each base-port that estimates a cut-through threshold value based on a certain portion of a packet that has to be received and stored at one of the plurality of storage locations before the packet is processed by one of the sub-ports that received the frame;
wherein the cut-through threshold value is determined based on an operating speed of a receive network link the packet is received on, an operating speed of a transmit network link the packet is transmitted on, and a protocol used by a sub-port for receiving and transmitting the packet;
wherein to determine the cut-through threshold value, the cut-through estimation circuit uses a first value and a second value to shift a maximum packet length for the packet, where the first value and the second value are obtained from a data structure and vary based on the operating speed of the network link the packet is received on and the operating speed of the network link the packet is transmitted on to its destination; and
wherein the cut-through estimation circuit uses subtraction for estimating the cut-through value without using division when the operating speed of the receive network link the packet is received on and the operating speed of the transmit network link the packet is transmitted on are non-integer multiples.

12. The system of claim 11, wherein the network device is a switch coupled to one or more devices.

13. The system of claim 11, wherein one of the plurality of sub-ports is configured to operate as a Fibre Channel port.

14. The system of claim 11, wherein one of the plurality of sub-ports is configured to operate as an Ethernet or Fibre Channel over Ethernet port.

15. The system of claim 11, wherein the cut-through estimation circuit is shared by the plurality of sub-ports.

* * * * *

UNITED STATES PATENT AND TRADEMARK OFFICE
CERTIFICATE OF CORRECTION

PATENT NO. : 9,444,713 B1  
APPLICATION NO. : 13/678086  
DATED : September 13, 2016  
INVENTOR(S) : Dropps et al.

Page 1 of 1

It is certified that error appears in the above-identified patent and that said Letters Patent is hereby corrected as shown below:

In Column 1, Line 58, delete "frame;" and insert -- frame. --, therefor.

In Column 2, Line 2, after "destination" insert -- . --.

In Column 3, Line 16, delete "embodiment:" and insert -- embodiment; --, therefor.

In Column 8, Line 51, after "208" insert -- . --.

Signed and Sealed this  
Fourteenth Day of February, 2017

Michelle K. Lee  
*Director of the United States Patent and Trademark Office*